(12) United States Patent
Hwang (10) Patent No.: US 7,394,675 B2
(45) Date of Patent: Jul. 1, 2008

(54) POWER SUPPLYING APPARATUS AND POWER SUPPLYING METHOD

(75) Inventor: Kyung-hoon Hwang, Yongin-si (KR)

(73) Assignee: Samsung Electronics Co., Ltd., Suwon-si (JP)

( * ) Notice: Subject to any disclaimer, the term of this patent is extended or adjusted under 35 U.S.C. 154(b) by 0 days.

(21) Appl. No.: 11/500,994

(22) Filed: Aug. 9, 2006

(65) Prior Publication Data
US 2007/0047274 A1 Mar. 1, 2007

(30) Foreign Application Priority Data
Aug. 29, 2005 (KR) ............... 10-2005-0079524

(51) Int. Cl.
*H02M 1/10* (2006.01)
*H02H 7/125* (2006.01)
(52) U.S. Cl. ............... 363/142; 363/54; 363/81; 363/85
(58) Field of Classification Search ............ 363/52–54, 363/85, 128, 142, 143, 81, 77
See application file for complete search history.

(56) References Cited

U.S. PATENT DOCUMENTS 4,837,672 A 6/1989 Donze
6,055,167 A * 4/2000 Shamkovich et al. ......... 363/52
6,449,180 B1 * 9/2002 Yang et al. .................. 363/142

FOREIGN PATENT DOCUMENTS

| JP | 2000-316280 | 11/2000 |
|---|---|---|
| JP | 2003-299351 | 10/2003 |
| JP | 2004-187391 | 7/2004 |
| KR | 1989-20072 | 10/1989 |
| KR | 1990-7410 | 10/1990 |
| KR | 1991-5463 | 7/1991 |
| KR | 1998-5693 | 3/1998 |
| KR | 1998-20277 | 7/1998 |

OTHER PUBLICATIONS

Office Action issued on Feb. 22, 2008 by the Chinese Patent Office for Chinese Application No. 200610125742.2

* cited by examiner

*Primary Examiner*—Gary L Laxton
(74) *Attorney, Agent, or Firm*—Stein, McEwen & Bui, LLP (57) ABSTRACT

A power supply operable from a plurality of alternating current inputs had having protection from abnormal operation. The power supply includes a switchable rectifier and a voltage to voltage converter. Protection circuits switch off at least one of the rectifier and the converter if the rectified voltage exceeds a predetermined voltage value and/or a current through the converter exceeds a predetermined current value. The protection circuits include latch circuits to prevent cyclic operation.

22 Claims, 4 Drawing Sheets

POWER SUPPLYING APPARATUS AND POWER SUPPLYING METHOD

CROSS-REFERENCE TO RELATED APPLICATIONS

This application claims the benefit of Korean Patent Application No. 2005-79524, filed Aug. 29, 2005, in the Korean Intellectual Property Office, the disclosure of which is incorporated herein by reference.

BACKGROUND OF THE INVENTION

1. Field of the Invention

Aspects of the present invention relate to a power supplying apparatus and a power supplying method, and more particularly, to a power supplying apparatus and a power supplying method which protect a circuit safely against over-voltage and over-current.

2. Description of the Related Art

A power supplying apparatus supplies proper power necessary to operate a circuit apparatus such as a computer system. Such circuit apparatus often needs direct current power as power, and consequently the power supplying apparatus rectifies input alternating current power and outputs direct current power.

Where the power supplying apparatus uses commercial alternating current power as an input, the input voltage may be a voltage such as 110V or 220V. Therefore, in order to accommodate both 110V and 220V input voltages, the power supplying apparatus uses the input 220V voltage "as is" and the input 110V input is doubled. Such a conventional power supplying apparatus is illustrated in FIG. 1.

Figure 1:
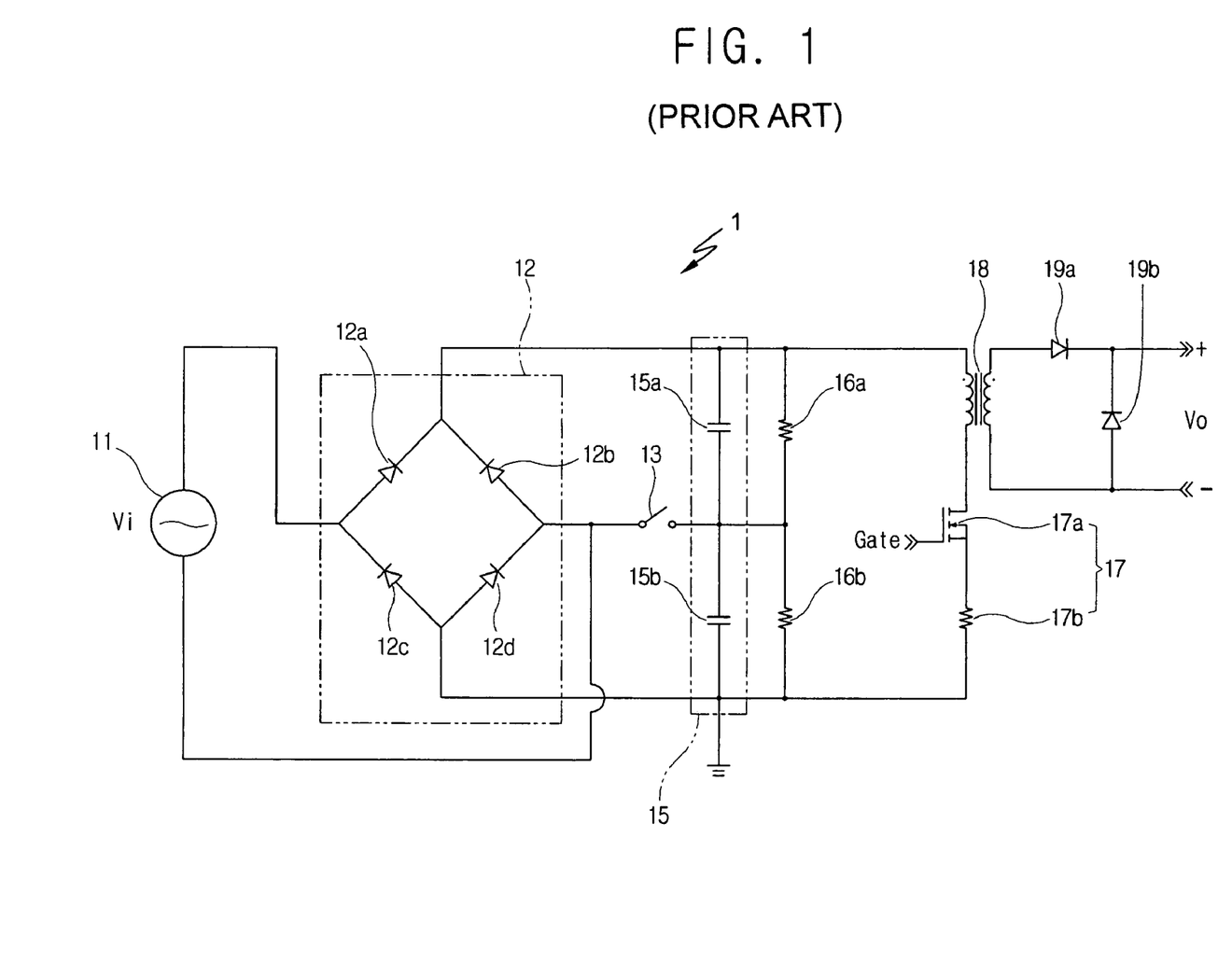
FIG. 1 is a schematic diagram showing a structure of a conventional power supplying apparatus using a method of doubling an input voltage.

The power supplying apparatus shown in FIG. 1 includes a rectifying part 12, a voltage selector 13, and a smoothing part 15. The rectifying part 12 includes diodes 12a, 12b, 12c and 12d and rectifies input alternating current power 11. The smoothing part 15 includes capacitors 15a and 15b that correspond to the input power 11 of 110V and 220V, for example, and charges energy of the current rectified by the rectifying part 12 into each capacitor 15a and 15b.

The voltage selector 13 is disposed in a predetermined current path between the rectifying part 12 and the smoothing part 15, and serves as a switch to pass or interrupt the current. As shown in FIG. 1, if the voltage selector 13 is open, a voltage proportional to a magnitude of the input power is charged in the series combination of the capacitors 15a and 15b. However, if the voltage selector 13 is closed, a voltage proportional to a magnitude of the input power voltage is charged in each of two capacitors 15a and 15b. In this case, a voltage corresponding to double the magnitude of the input voltage is charged into the series combination of capacitors 15a and 15b. That is, where the input voltage is 110V, the power supplying apparatus outputs a direct current voltage proportional to double the input voltage.

However, although the input voltage is 220V, the voltage selector 13 may be closed due to a user's mistake or erroneous operation of the apparatus. In this case, the capacitors 15a and 15b may be damaged due to a voltage 1.4 times 220V being applied to each of the capacitors 15a and 15b.

The power supplying apparatus 1 universally uses a switch-mode power supply (SMPS) which is advantageous in terms of efficiency. The switch-mode power supplying apparatus 1 further includes a MOSFET 17a, a transformer 18, and diodes 19a and 19b. The power supplying apparatus 1 converts a magnitude of the voltage applied to the smoothing part 15 through the transformer 18 to output a voltage Vo with turning on and off the MOSFET 17a using pulse width modulation (PWM).

According to the switch-mode power supplying apparatus 1, if the voltage selector 13 is closed due to user's mistake and an input voltage of 220V is supplied, an over-current may result in the MOSFET 17a, potentially resulting in an explosion. Further, even if the input voltage is applied consistent with the position of the voltage selector 13, if a problem related to feedback loop occurs upon operating the PWM or gate on time in the MOSFET 17a is raised due to degradation of a PWM controller IC, the MOSFET 17a may be also damaged.

SUMMARY OF THE INVENTION

Accordingly, an aspect of the present invention is to provide a power supplying apparatus and a power supplying method with superior stability against over-voltage and over-current.

Additional aspects and/or advantages of the invention will be set forth in part in the description which follows and, in part, will be obvious from the description, or may be learned by practice of the invention.

The foregoing and/or other aspects of the present invention may be achieved by providing a power supplying apparatus comprising: a rectifying part rectifying an input alternating current to output a direct current; a smoothing part connectable with the rectifying part in a plurality of current paths and smoothing a voltage of the direct current input from the rectifying part through each of the current paths; a voltage selecting part selecting a magnitude of the smoothed voltage by controlling at least one of the plurality of current paths; and a smoothing protection part estimating the magnitude of the smoothed voltage and suspending the direct current output from the rectifying part if the estimated magnitude of the voltage is determined to be more than a predetermined voltage value.

According to an aspect of the present invention, the smoothing protection part comprises a first operation maintaining part which maintains the suspending of the output direct current.

According to an aspect of the present invention, the power supplying apparatus further comprises: a transforming part converting the magnitude of the smoothed voltage to output another voltage; a switching part determining the magnitude of the another voltage by controlling a flow of a current input to the transforming part; and a switching protection part estimating a magnitude of the current flowing in the switching part and suspending an operation of the switching part if the estimated magnitude of the current is more than a predetermined value.

According to an aspect of the present invention, the switching protection part comprises a second operation maintaining part which maintains the suspending of the switching part.

According to an aspect of the present invention, the switching protection part estimates the magnitude of the current flowing in the switching part and suspends the direct current output from the rectifying part if the estimated magnitude of the current flowing in the switching part is more than the predetermined current value.

According to an aspect of the present invention, the smoothing protection part estimates the magnitude of the smoothed voltage and suspends the operation of the switching part if the estimated magnitude of the smoothed voltage is more than the predetermined voltage value.

The foregoing and/or another aspects of the present invention may be achieved by providing a power supplying apparatus, comprising: a rectifying part rectifying an input alternating current to output a direct current; a smoothing part connectable with the rectifying part in a plurality of current paths and smoothing a voltage of the direct current input from the rectifying part; a voltage selecting part selecting a magnitude of the smoothed voltage by controlling at least one of the plurality of current paths; a transforming part converting the magnitude of the smoothed voltage to output another voltage; a switching part determining a magnitude of the another voltage by controlling a flow of the current input to the transforming part; and a switching protection part estimating a magnitude of the current flowing in the switching part and suspending an operation of the switching part if the estimated magnitude of the current flowing in the switching part is determined to be more than a predetermined current value.

According to an aspect of the present invention, the switching protection part comprises an operation maintaining part which maintains the suspending of the switching part.

The foregoing and/or another aspects of the present invention may be achieved by providing a method of operating a power supplying apparatus comprising a rectifying part rectifying an input alternating current to output a direct current; a smoothing part connectable with the rectifying part in a plurality of current paths and smoothing a voltage of the direct current input from the rectifying part; a voltage selecting part selecting a magnitude of the smoothed voltage by controlling at least one of the plurality of current paths, the method comprising: estimating the magnitude of the smoothed voltage; and suspending the output of direct current from the rectifying part if the magnitude of the estimated voltage is more than a predetermined voltage value.

According to an aspect of the present invention, the suspending of the output of the direct current comprises maintaining the suspending the direct current output.

According to an aspect of the present invention, the power supplying apparatus further comprises a transforming part converting the magnitude of the smoothed voltage to output another voltage; a switching part determining the magnitude of the another voltage by controlling a flow of the current input to the transforming part, the power supplying method further comprising: estimating a magnitude of the current flowing in the switching part; and suspending the operation of the switching part if the magnitude of the estimated current is more than a predetermined current value.

According to an aspect of the present invention, the suspending of the operation of the switching part comprises maintaining the suspending of the switching part.

According to an aspect of the present invention, the power supplying method further comprises suspending the direct current output from the rectifying part if the magnitude of the current flowing in the switching part is more than the predetermined current value.

According to an aspect of the present invention, the power supplying method further comprises suspending the operation of the switching part if the magnitude of the smoothed voltage is more than the predetermined voltage value.

The foregoing and/or another aspects of the present invention may be achieved by providing a method of operating a power supplying apparatus including a rectifying part rectifying an input alternating current to output a direct current; a smoothing part connectable with the rectifying part in a plurality of current paths for smoothing a voltage of the direct current input from the rectifying part; a voltage selecting part selecting a magnitude of the smoothed voltage by controlling at least one of the plurality of current paths; a transforming part converting the magnitude of the smoothed voltage to output another voltage; and a switching part determining the magnitude of the another voltage by controlling a flow of the current input to the transforming part, the method comprising: estimating a magnitude of the current flowing in the switching part; and suspending the operation of the switching part if the magnitude of the estimated current is more than a predetermined value.

According to an aspect of the present invention, the suspending of the operation of the switching part comprises maintaining the suspending the switching part.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
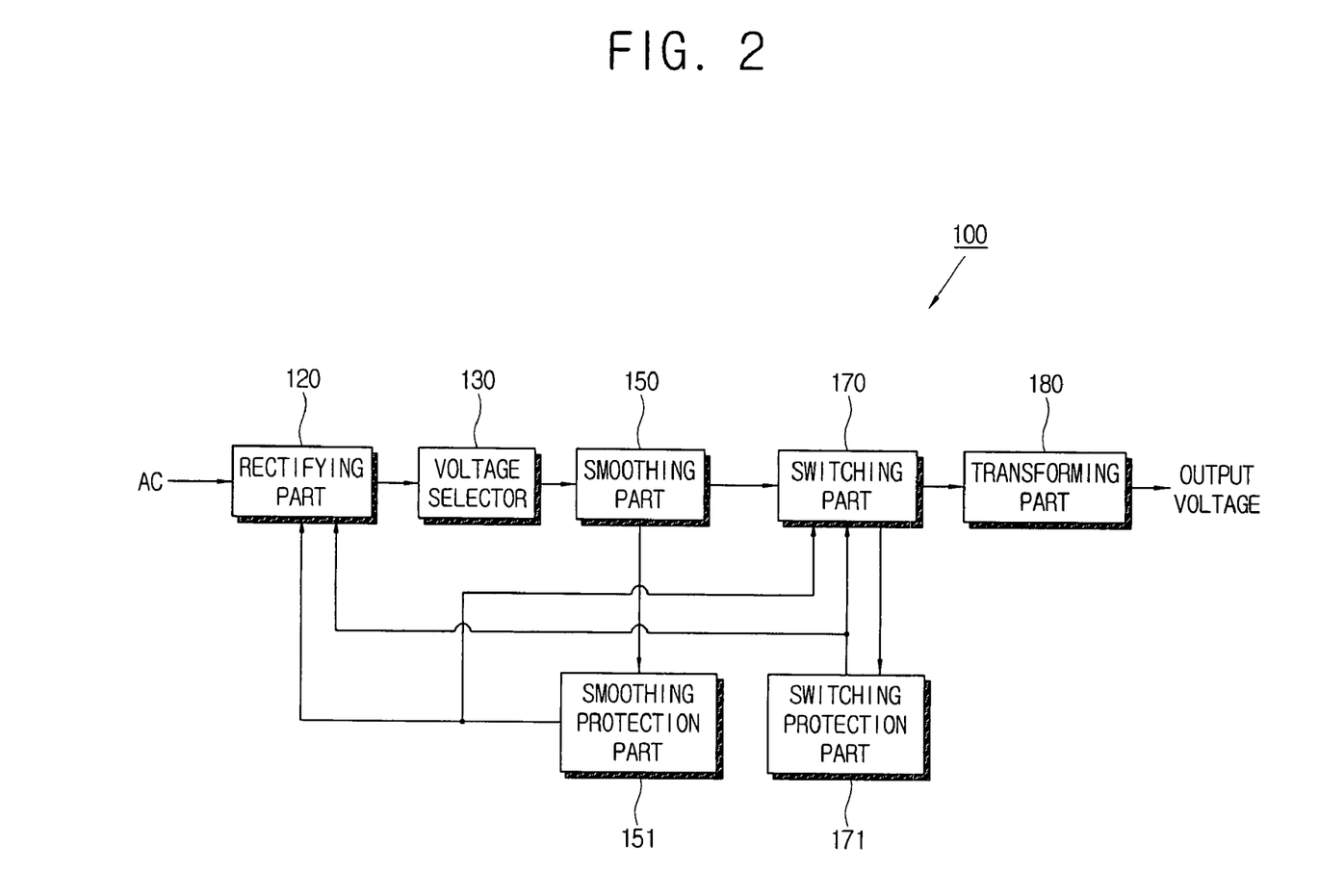
FIG. 2 is a block diagram showing a structure of a power supplying apparatus according to an embodiment of the present invention.

FIG. 2 is a block diagram showing a structure of a power supplying apparatus 100 according to an embodiment of the present invention. The power supplying apparatus 100 supplies power to an electronic device, such as for example, a computer system. The power supplying apparatus 100 includes a rectifying part 120, a voltage selecting part 130, a smoothing part 150, a smoothing protection part 151, a switching part 170 and a transforming part 180. An alternating current is input to the rectifying part 120 where the alternating current is rectified and output as a direct current. The smoothing part 150 is connected with the rectifying part 120 in a plurality of current paths for smoothing a voltage of the direct current input from the rectifying part 120. The voltage selecting part 130 selects a magnitude of the voltage smoothed by the smoothing part 150 by controlling the plurality of current paths between the rectifying part 120 and the smoothing part 150. The transforming part 180 converts the magnitude of the voltage smoothed by the smoothing part 150 and outputs the converted voltage. The switching part 170 determines a magnitude of the converted voltage by controlling a flow of a current input to the transforming part 180. The smoothing protection part 151 may estimate a magnitude of the voltage smoothed by the smoothing part 150 and suspend the output of direct current from the rectifying part 120 if the estimated magnitude of the voltage is determined to be more than a predetermined voltage value. The power supply apparatus 100 may further comprise a switching protection part 171 estimating a magnitude of the current input to the transforming part 180 and suspending the output of the converted voltage if the current input to the transforming part is determined to be more than a predetermined current value.

Figure 3:
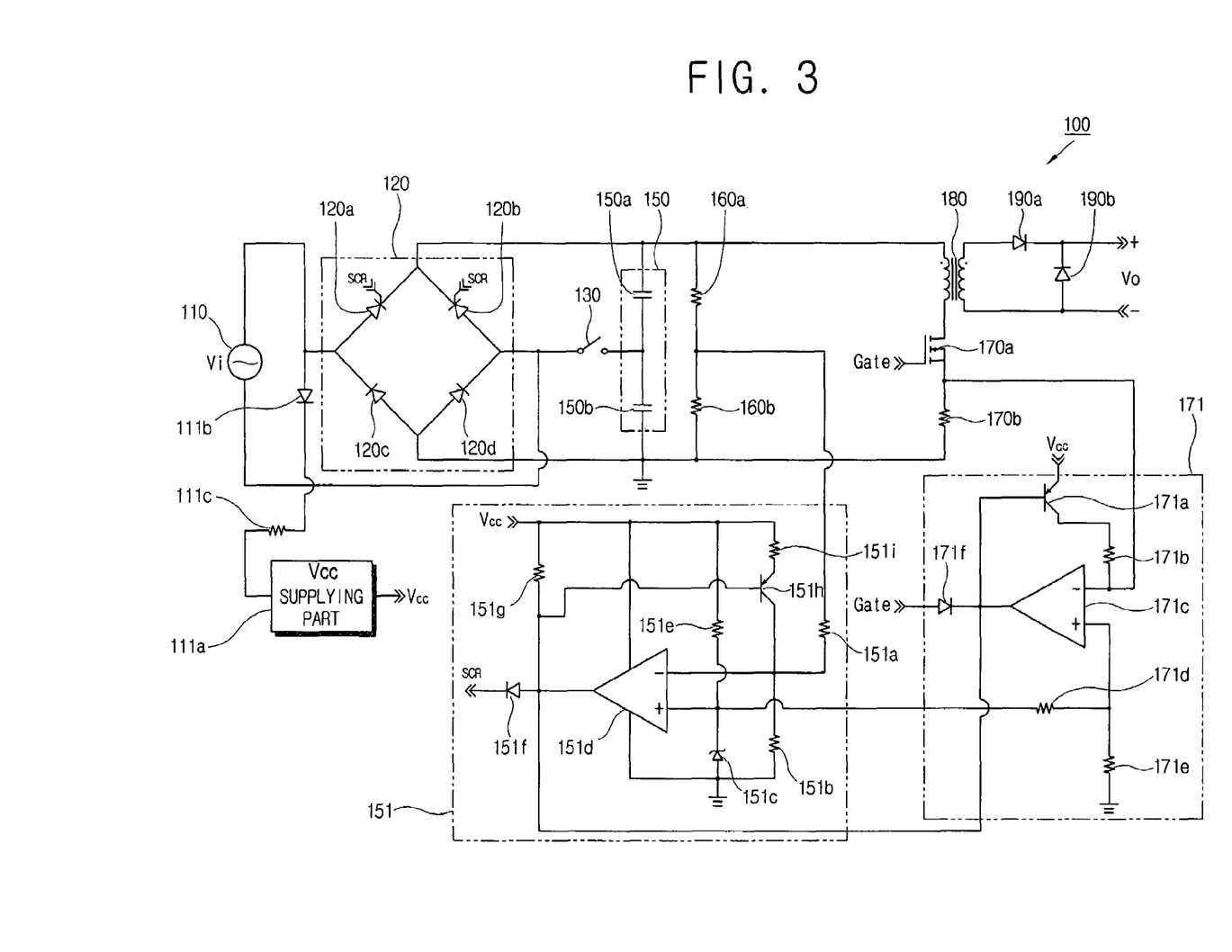
FIG. 3 is a circuit diagram showing a circuit implementing the power supplying apparatus shown in FIG. 2.

FIG. 3 is a circuit diagram showing an example circuit implementing the power supplying apparatus 100. The rectifying part 120 includes SCRs 120a and 120b and diodes 120c and 120d and rectifies input alternating power 110 to output direct current. The smoothing part 150 includes capacitors 150a and 150b and charges energy of the current rectified by the rectifying part 120 into each of the capacitors 150a or 150b.

The voltage selecting part 130 is disposed in a predetermined current path between the rectifying part 120 and the smoothing part 150 and serves as a switch for passing or interrupting a current. As shown in FIG. 3, if the voltage selecting part 130 is open, a voltage proportional to a magnitude as the input power is charged into the series combination of the capacitors 150a and 150b. If the voltage selecting part 130 is closed, the voltage proportional to the magnitude as the input power is charged into each of the capacitors 150a and 150b. With the voltage selecting part closed, a voltage corresponding to double the input voltage is charged into the series combination of the capacitors 150a and 150b. That is, with the voltage selecting part 130 closed and an input voltage of 110V, the voltage across the capacitors 150a and 150b is about the same as the voltage with an input voltage of 220V with the voltage selecting part open.

The power supplying apparatus 100 operates in a switch mode manner and further includes a MOSFET 170a, a transforming part 180 and diodes 190a and 190b. The MOSFET 170a is an example of the switching part 170 shown in FIG. 2. The power supplying apparatus 100 converts the magnitude of the voltage applied by the smoothing part 150 to the transforming part 180 to an output voltage Vo with turning on or off the MOSFET 170a using a switching technique, such as for example, pulse width modulation.

The smoothing protection part 151 includes resistors 151a and 151b sensing a voltage across the capacitors 150a and 150b, a resistor 151e and a zener diode 151c providing a reference voltage, a comparator 151d having respective inputs to which a voltage across the resistor 151b and the reference voltage provided by the zener diode 151c are applied, and a diode 151f for determining a current direction of an output in the comparator 151d. The output of the comparator 151d is connected with respective trigger inputs of the SCRs 120a and 120b via the diode 151f. The power supplying apparatus 100 further includes a Vcc supplying part 111a, a diode 111b and a resistor 111c supplying a voltage Vcc for the smoothing protection part 151 and the switching protection part 171.

The reference voltage of the zener diode 151c is set correspondingly with a normal voltage across the capacitors 150a and 150b. The resistance values of the resistors 151a and 151b are set so that when the power supplying apparatus 100 operates normally, a voltage across the resistor 151b is lower than the reference voltage of the zener diode 151c and in this case the output of the comparator 151d is High, thereby causing SCRs 120a and 120b to operate as diodes, resulting in normal rectifying operation.

If the power supplying apparatus 100 operates abnormally, as in a case where the voltage selecting part 130 is closed and the input voltage of 220V, the voltage across the resistor 151b will be higher than the reference voltage of the zener diode 151c and in this case the output of the comparator 151d is Low, thereby causing the SCRs 120a and 120b to be turned off interrupting the current output by the rectifying part 120. Consequently, over-voltage is prevented from being charged into the capacitors 150a and 150b.

The smoothing protection part 151 further includes a latch-up circuit holding the output of the comparator 151 Low. The latch-up circuit includes a transistor 151h and a resistor 151i. The latch-up circuit prevents the abnormal operation and the protection operation from being cyclic. Without the latch-up circuit the smoothing protection part 151 operates to interrupt the current flowing in the rectifying part 120, the voltage charged into the capacitor 150b is lowered so that the smoothing protection part 151 terminates the protection operation, the voltage charged into the capacitor 150b rises, and the smoothing protection part 151 again carries out the protection operation.

The power supplying apparatus 100 may further include a switching protection part 171 estimating a magnitude of the current flowing in the switching part 170 and suspending operation of the switching part 170 if the estimated magnitude of the current is determined to be more than a predetermined value. The switching protection part 171 includes a resistor 170b detecting a current flowing in a drain and a source of the MOSFET 170a, resistors 171d and 171e providing a reference voltage of the over-current protection circuit, a comparator 171c having respective inputs to which the over-current protection reference voltage across the resistor 171e and a voltage across the resistor 170b are input, and a diode 171f determining a flow of a gate voltage signal to the MOSFET 170a. The power supplying apparatus 100 further includes a PWM controller (not shown) supplying the gate voltage signal to the MOSFET 170a.

The resistance values of resistors 171d and 171e are set correspondingly with the resistance value of the resistor 170b and a reference current of the MOSFET 170a. If the power supplying apparatus 100 operates normally, the voltage across the resistor 170b is set lower than the over-current protection reference voltage, and in this case the output of the comparator 171c is High and the gate voltage signal to the MOSFET 170a from the PWM controller (not shown) is applied to the gate of the MOSFET 170a and the switching part 170 operates normally.

If the voltage selecting part 130 is closed with the input voltage of 220V, or the power supplying apparatus 100 operates abnormally as in cases of occurrence of a problem related to feedback loop of PWM operation or degradation of a PWM controller IC, the voltage across the resistor 171b becomes higher than the over-current protection reference voltage, and in this case the output of the comparator 151d is Low, thereby causing the gate voltage signal from the PWM controller to be interrupted by the output of the comparator 171c via the diode 171f. Therefore, the operation of the MOSFET 170a is suspended to interrupt the current flowing through the drain and the source of the MOSFET 170a so that the MOSFET 170a is protected.

The switching protection part 171 further includes a latch-up circuit holding the output of the comparator 171c Low. The latch-up circuit of the switching protection part 171 may include a transistor 171a and a resistor 171b. The latch-up circuit of the switching protection part 171 prevents the abnormal operations and the protection operation from being cyclic, in a similar manner as the latch-up circuit of the smoothing protection part 151 prevents cyclic operation.

The output of the comparator 151d and the output of the comparator 171c are mutually connected. Consequently, where the output in any one of the comparator 151d and the comparator 171c is Low, the smoothing part 150 and switching part 170 are both protected.

Figure 4:
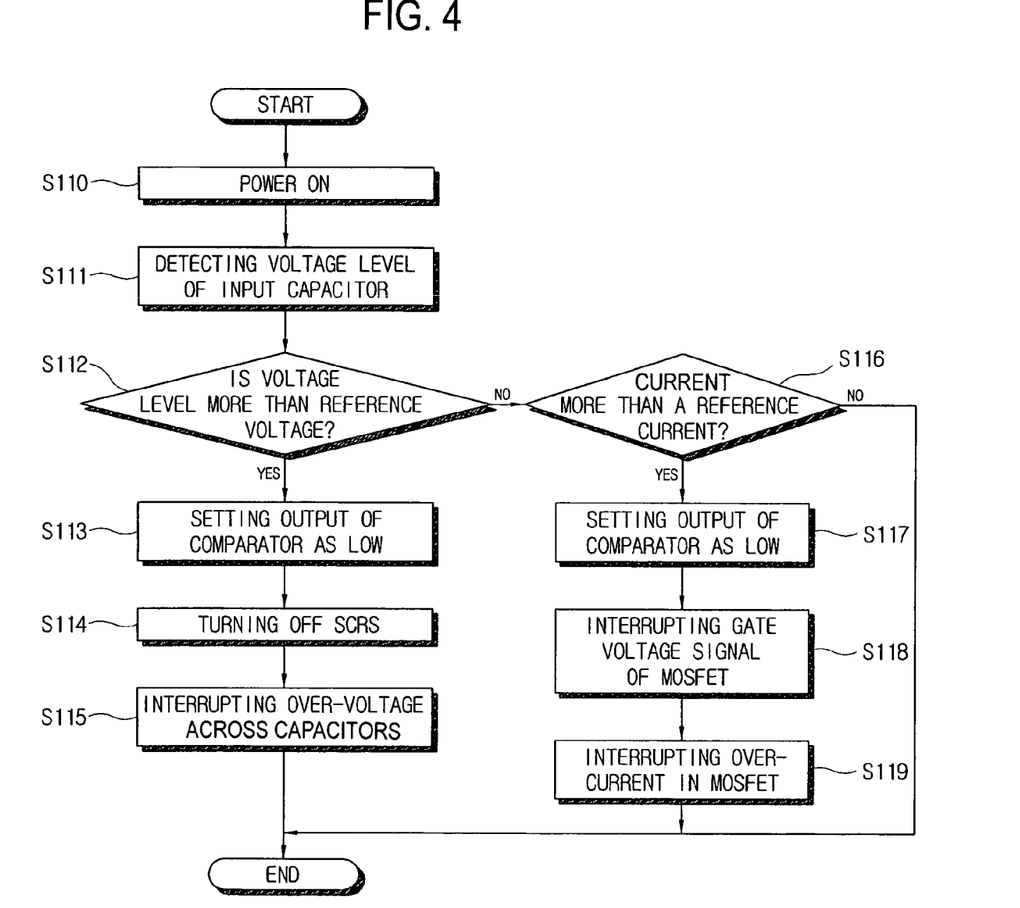
FIG. 4 is a flow chart showing an operation of the power supplying apparatus of shown in FIGS. 2 and 3.

FIG. 4 is a flow chart showing an operation of the power supplying apparatus 100. Power is supplied to the power supplying apparatus 100 at operation S110 and a voltage level across the capacitors 150*a* and 150*b* is detected at operation S111. A determination of whether the detected voltage level is more than a reference voltage is made at operation S112, and an output of the comparator 151*d* is set as Low at operation S113, if the detected voltage level is more than the reference voltage, thereby causing the SCRs 120*a* and 120*b* to be turned off at operation S114. Therefore, the over-voltage across the capacitors 150*a* and 150*b* is interrupted at operation S115.

If the detected voltage level across the capacitors 150*a* and 150*b* is not more than the reference voltage, a determination of whether a current flowing in the MOSFET 170*a* is more than a reference current is made at operation S116. If the current flowing through the MOSFET 170*a* is more than the reference current, an output of the comparator 171*c* is set as Low at operation S117, thereby causing a gate voltage signal of the MOSFET 170*a* to be interrupted at operation S118. Therefore, over-current is prevented from flowing in the MOSFET 170*a*.

As described above, the present invention provides a power supplying apparatus and a power supplying method with superior stability against over-voltage and over-current.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power supplying apparatus comprising:
   a rectifying part rectifying an input alternating current to output a direct current;
   a smoothing part connectable with the rectifying part in a plurality of current paths for smoothing a voltage of the direct current input from the rectifying part through each of the current paths;
   a voltage selecting part selecting a magnitude of the smoothed voltage by controlling at least one of the plurality of current paths; and
   a smoothing protection part estimating the magnitude of the smoothed voltage and suspending the direct current output from the rectifying part if the estimated magnitude of the smoothed voltage is more than a predetermined voltage value.

2. The power supplying apparatus of claim 1, wherein the smoothing protection part comprises a first operation maintaining part which maintains an operation of suspending the output direct current.

3. The power supplying apparatus of claim 1, further comprising:
   a transforming part converting the magnitude of the smoothed voltage to output another voltage;
   a switching part determining the magnitude of the another voltage by controlling a flow of a current input to the transforming part; and
   a switching protection part estimating a magnitude of the current flowing in the switching part and suspending an operation of the switching part if the estimated magnitude of the current flowing through the switching part is more than a predetermined current value.

4. The power supplying apparatus of claim 3, wherein the switching protection part comprises an operation maintaining part maintaining the suspending of the switching part.

5. The power supplying apparatus of claim 3, wherein the switching protection part suspends the direct current output from the rectifying part if the estimated magnitude of the current flowing through the switching part is more than the predetermined current value.

6. The power supplying apparatus of claim 3, wherein the smoothing protection part suspends the operation of the switching part if the estimated magnitude of the smoothed voltage more than the predetermined voltage value.

7. A power supplying apparatus, comprising:
   a rectifying part rectifying an input alternating current to output a direct current;
   a smoothing part connectable with the rectifying part in a plurality of current paths and smoothing a voltage of the direct current;
   a voltage selecting part selecting a magnitude of the smoothed voltage by controlling at least one of the plurality of current paths;
   a transforming part converting the magnitude of the smoothed voltage to output another voltage;
   a switching part determining the magnitude of the another voltage by controlling a flow of a current input to the transforming part; and
   a switching protection part estimating a magnitude of the current flowing in the switching part and suspending an operation of the switching part if the estimated magnitude of the current is more than a predetermined value.

8. The power supplying apparatus of claim 7, wherein the switching protection part comprises an operation maintaining part which maintains the suspending of the switching part.

9. A method of operating a power supplying apparatus comprising a rectifying part rectifying an input alternating current to output a direct current; a smoothing part connectable with the rectifying part in a plurality of current paths smoothing a voltage of the direct current inputted from the rectifying part; and a voltage selecting part selecting a magnitude of the smoothed voltage by controlling at least one of the plurality of current paths, the method comprising:
   estimating the magnitude of the smoothed voltage; and
   suspending the direct current output from the rectifying part if the estimated magnitude of the smoothed voltage is more than a predetermined voltage value.

10. The power supplying method of claim 9, wherein the suspending of the output direct current comprises maintaining the suspending the output direct current.

11. The power supplying method of claim 9, wherein the power supplying apparatus further comprises a transforming part converting the magnitude of the smoothed voltage to another voltage; a switching part determining the magnitude of the another voltage by controlling a flow of a current input to the transforming part, the power supplying method further comprising:
   estimating a magnitude of the current flowing in the switching part; and
   suspending an operation of the switching part if the estimated magnitude is more than a predetermined current value.

12. The power supplying method of claim 11, wherein the suspending of the operation of the switching part comprises maintaining the suspending of the operation of the switching part.

13. The power supplying method of claim 11, further comprising suspending the direct current output from the rectifying part if the magnitude of the current flowing in the switching part is more than the predetermined current value.

14. The power supplying method of claim 11, further comprising suspending the operation of the switching part if the magnitude of the smoothed voltage is more than the predetermined voltage value.

15. A method of operating a power supplying apparatus including a rectifying part rectifying an input alternating current to output a direct current; a smoothing part connectable with the rectifying part in a plurality of current paths smoothing a voltage of the direct current; a voltage selecting part selecting a magnitude of the smoothed voltage by controlling at least one of the plurality of current paths; a transforming part converting the magnitude of the smoothed voltage to output another voltage; and a switching part determining a magnitude of the another voltage by controlling a flow of current input to the transforming part, the method comprising:

estimating a magnitude of the current flowing in the switching part; and suspending an operation of the switching part if the estimated magnitude of the current flowing through the switching part is more than a predetermined value.

16. The power supplying method of claim 15, wherein the suspending of the operation of the switching part comprises maintaining the suspending the switching part.

17. A power supply apparatus, comprising:

a first voltage converter selectively operable from a plurality of input alternating current voltages and outputting a first direct current voltage;

a second voltage converter converting the first direct current voltage to a second direct current voltage; and a protection circuit switching off the first voltage converter, if a current through the second voltage converter exceeds a predetermined current, and switching off the second voltage converter, if the first direct current voltage exceeds a predetermined voltage.

18. The power supply apparatus of claim 17, wherein the protection circuit includes a latch maintaining the first voltage converter switched off.

19. The power supply apparatus of claim 17, wherein the protection circuit includes a latch maintaining the second voltage converter switched off.

20. The power supply apparatus of claim 17, wherein:

the first voltage converter comprises a plurality of SCRs which rectify the input alternating current voltage; and the protection circuit outputs a control signal to turn off the SCRs if the first direct current voltage exceeds the predetermined voltage value and/or the current through the second voltage converter exceeds the predetermined current value.

21. The power supply apparatus of claim 17, wherein:

the second voltage converter comprises a switch to switch the current through the second voltage converter to output the second direct current voltage; and the protection circuit outputs a control signal to disable the switching of the switch if the first direct current voltage exceeds the predetermined voltage value and/or the current through the second voltage converter exceeds the predetermined current value.

22. The power supply apparatus of claim 17, wherein:

the first voltage converter comprises a plurality of SCRs which rectify the input alternating current voltage;

the second voltage converter comprises a switch to switch the current through the second voltage converter to output the second direct current voltage; and the protection circuit outputs a first control signal to turn off the SCRs if the first direct current voltage exceeds the predetermined voltage value and/or the current through the second voltage converter exceeds the predetermined current value and outputs a second control signal to disable the switching of the switch if the first direct current voltage exceeds the predetermined voltage value and/or the current through the second voltage converter exceeds the predetermined current value.

* * * * *

UNITED STATES PATENT AND TRADEMARK OFFICE
CERTIFICATE OF CORRECTION

PATENT NO. : 7,394,675 B2
APPLICATION NO. : 11/500994
DATED : July 1, 2008
INVENTOR(S) : Kyung-hoon Hwang It is certified that error appears in the above-identified patent and that said Letters Patent is hereby corrected as shown below:

Title Page, Item (73) Assignee, change
"Samsung Electronics Co., Ltd., Suwon-si (JP)" to
--Samsung Electronics Co., Ltd., Suwon-si (KR)--.

Signed and Sealed this

Twenty-sixth Day of August, 2008

JON W. DUDAS
*Director of the United States Patent and Trademark Office*